(12) United States Patent
Ko et al.

(10) Patent No.: US 10,956,882 B2
(45) Date of Patent: Mar. 23, 2021

(54) KIOSK DEVICE FOR MOTOR VEHICLE AND METHOD FOR OPERATING THE SAME

(71) Applicant: NAUTILUS HYOSUNG INC., Seoul (KR)

(72) Inventors: Myoung Hwan Ko, Seoul (KR); Boick Chang, Hanam-si (KR); Sung Chul Lee, Seoul (KR)

(73) Assignee: HYOSUNG TNS INC., Seoul (KR)

(*) Notice: Subject to any disclaimer, the term of this patent is extended or adjusted under 35 U.S.C. 154(b) by 345 days.

(21) Appl. No.: 15/841,100

(22) Filed: Dec. 13, 2017

(65) Prior Publication Data

US 2019/0122193 A1    Apr. 25, 2019

(30) Foreign Application Priority Data

Oct. 23, 2017  (KR) .................. 10-2017-0137727

(51) Int. Cl.
  *G06Q 20/18*  (2012.01)
  *B60R 11/04*  (2006.01)
  *G07B 15/02*  (2011.01)

(52) U.S. Cl.
  CPC ............. *G06Q 20/18* (2013.01); *B60R 11/04* (2013.01); *G07B 15/02* (2013.01); *B60R 2300/30* (2013.01); *B60R 2300/8006* (2013.01)

(58) Field of Classification Search
  CPC ..... G06Q 20/18; B60R 11/04; B60R 2300/30; B60R 2300/8006; H04N 21/64307; G07B 15/02
  See application file for complete search history.

(56) References Cited

U.S. PATENT DOCUMENTS 6,494,363 B1 * 12/2002 Roger ..................... G07F 19/20
                                                    235/379
6,505,774 B1 *  1/2003 Fulcher ............... G06Q 30/0284
                                                    235/379
(Continued)

FOREIGN PATENT DOCUMENTS

KR         20150001937 A  *  1/2015

OTHER PUBLICATIONS

"This ATM can be adjusted to the height of your car", published by Reddit.com on Dec. 24, 2015 https://web.archive.org/web/20151224094128/https://www.reddit.com/r/mildlyinteresting/comments/3jruud/this_atm_can_be_adjusted_to_the_height_of_your_car/ (Year: 2015).*

*Primary Examiner* — Rupangini Singh
(74) *Attorney, Agent, or Firm* — Fenwick & West LLP

(57) ABSTRACT

A kiosk device for a motor vehicle includes an imaging unit, a voice input unit, a vehicle detecting unit configured to detect entry of a motor vehicle, a financial automation transaction unit including a touch interface unit, a control unit and a driving unit. When the entry of the motor vehicle is detected by the vehicle detecting unit, the control unit activates the imaging unit and the voice input unit and analyze motion information of a vehicle occupant imaged by the imaging unit or voice information of the vehicle occupant inputted through the voice input unit. The driving unit drives the financial automation transaction unit based on an analysis result of the motion information or the voice information so that the financial automation transaction unit is operated to face a direction of a vehicle occupant location.

12 Claims, 3 Drawing Sheets

(56) References Cited

U.S. PATENT DOCUMENTS

| | | | |
|---|---|---|---|
| 7,644,039 B1* | 1/2010 | Magee | G06Q 20/1085 |
| | | | 221/9 |
| 9,407,704 B2* | 8/2016 | Yu | H04L 65/403 |
| 2005/0268107 A1* | 12/2005 | Harris | H04L 63/0861 |
| | | | 713/182 |
| 2010/0126805 A1* | 5/2010 | Oh | G07F 19/205 |
| | | | 186/37 |
| 2011/0075045 A1* | 3/2011 | Mameda | H04N 21/41407 |
| | | | 348/725 |
| 2014/0121838 A1* | 5/2014 | Ahn | F16M 11/046 |
| | | | 700/275 |

* cited by examiner

KIOSK DEVICE FOR MOTOR VEHICLE AND METHOD FOR OPERATING THE SAME

CROSS-REFERENCE TO RELATED APPLICATION

This application is based on and claims priority from Republic of Korea Patent Application No. 10-2017-0137727, filed on Oct. 23, 2017, the disclosure of which is incorporated herein in its entirety by reference for all purposes.

TECHNICAL FIELD

The present disclosure relates to a kiosk device for a motor vehicle and a method for operating the same.

BACKGROUND

A kiosk device refers to an unmanned information terminal installed in a public place, e.g., a government agency, a local government, a financial institution, a department store, an exhibition hall or the like. The kiosk device is an unmanned comprehensive information guidance system for providing dynamic traffic information, public transport information, route guidance information, reservation work information, various kinds of telephone number and address guidance information, administrative procedure information, product information, information on usage method of facilities, and the like. In a metropolitan city where motor vehicles are frequently used, there is a tendency that unmanned general information guidance services for enabling vehicle occupants to carry out kiosk transactions while boarding on a motor vehicle are actively utilized.

Among kiosk devices used in the art, a device installed and operated by a financial institution to provide financial services is referred to as a financial automation device. In general, it is often the case that a kiosk device such as a financial automation device or the like employs an input/output interface including a large screen display and a touch sensor in order to improve the user's input convenience and the ease of recognition of displayed information.

In particular, in the case of a kiosk device for a motor vehicle, it is necessary to provide a service environment in which an input/output interface can be used more conveniently by a vehicle occupant.

SUMMARY

Embodiments of the present disclosure provide a kiosk device for a motor vehicle and a method for operating the same, which are capable of quickly operating an input/output interface for kiosk transactions at the time of vehicle entry.

Furthermore, embodiments of the present disclosure provide a kiosk device for a motor vehicle and a method for operating the same, which are capable of providing an input/output interface environment for kiosk transactions that can improve the user convenience in terms of a vehicle occupant.

However, the objects of the embodiments of the present disclosure are not limited to the above-mentioned ones. Other objects will be clearly understood by an ordinary skilled person from the contents described below.

In accordance with an aspect, there is provided a kiosk device for a motor vehicle, including: an imaging unit; a voice input unit; a vehicle detecting unit configured to detect entry of a motor vehicle; a financial automation transaction unit including a touch interface unit; a control unit configured to, when the entry of the motor vehicle is detected by the vehicle detecting unit, activate the imaging unit and the voice input unit and analyze motion information of a vehicle occupant imaged by the imaging unit or voice information of the vehicle occupant inputted through the voice input unit; and a driving unit configured to drive the financial automation transaction unit based on an analysis result of the motion information or the voice information so that the financial automation transaction unit is operated to face a direction of a vehicle occupant location.

The control unit may be configured to analyze the direction of the vehicle occupant location with respect to the kiosk device.

The control unit may be configured to analyze a face position of the vehicle occupant based on an image captured by the imaging unit and to determine the analyzed face position as the direction of the vehicle occupant location.

The control unit may be configured to analyze a window position of a driver's seat of the motor vehicle based on an image captured by the imaging unit and to determine the analyzed window position as the direction of the vehicle occupant location.

The control unit may be configured to analyze a voice generation position of the vehicle occupant based on a voice inputted by the voice input unit and to determine the analyzed voice generation position as the direction of the vehicle occupant location.

The kiosk device for a motor vehicle may further includes: an illuminance detecting unit configured to detect ambient illuminance around the touch interface unit when the touch interface unit is operated, and the control unit may be configured to adjust brightness of the operated touch interface unit based on the detected ambient illuminance.

The driving unit may be configured to tilt, swivel or elevate at least one of the imaging unit, the voice input unit and the touch interface unit.

The motion information may include at least one of gesture recognition information and eye tracking information.

The control unit may be configured to analyze the motion information or the voice information according to a preset priority order when the motion information and the voice information are inputted at the same time.

In accordance with another aspect, there is provided a method for operating a kiosk device for a motor vehicle including an imaging unit and a voice input unit, the method including: a step of activating the imaging unit and the voice input unit when entry of a motor vehicle is detected; a step of analyzing motion information of a vehicle occupant imaged by the imaging unit or voice information of the vehicle occupant inputted through the voice input unit; and a step of driving the imaging unit and the voice input unit based on an analysis result of the motion information or the voice information so that a financial automation transaction unit including a touch interface unit is operated to face a direction of a vehicle occupant location.

The step of analyzing may include a step of analyzing the direction of the vehicle occupant location with respect to the kiosk device.

The step of analyzing may include a step of analyzing a face position of the vehicle occupant based on an image captured by the imaging unit and determining the analyzed face position as the direction of the vehicle occupant location.

The step of analyzing may include a step of analyzing a window position of a driver's seat of the motor vehicle based on an image captured by the imaging unit and determining the analyzed window position as the direction of the vehicle occupant location.

The step of analyzing may include a step of analyzing a voice generation position of the vehicle occupant based on a voice inputted by the voice input unit and determining the analyzed voice generation position as the direction of the vehicle occupant location.

The method for operating the kiosk device for a motor vehicle may further include: a step of detecting ambient illuminance around the touch interface unit when the touch interface unit is operated, and a step of adjusting brightness of the operated touch interface unit based on the detected ambient illuminance.

The step of driving may include a step of tilting, swiveling or elevating at least one of the imaging unit, the voice input unit and the touch interface unit.

The motion information may include at least one of gesture recognition information and eye tracking information.

The step of analyzing may include a step of analyzing the motion information or the voice information according to a preset priority order when the motion information and the voice information are inputted at the same time.

According to the embodiments of the present disclosure, it is possible to quickly operate an input/output interface for kiosk transactions at the time of vehicle entry. It is also possible to provide an input/output interface environment for kiosk transactions that can improve the user convenience in terms of a vehicle occupant. Thus, according to the embodiments of the present disclosure, it is possible to enhance the service satisfaction level of a kiosk device for a motor vehicle.

DETAILED DESCRIPTION

Figure 1:
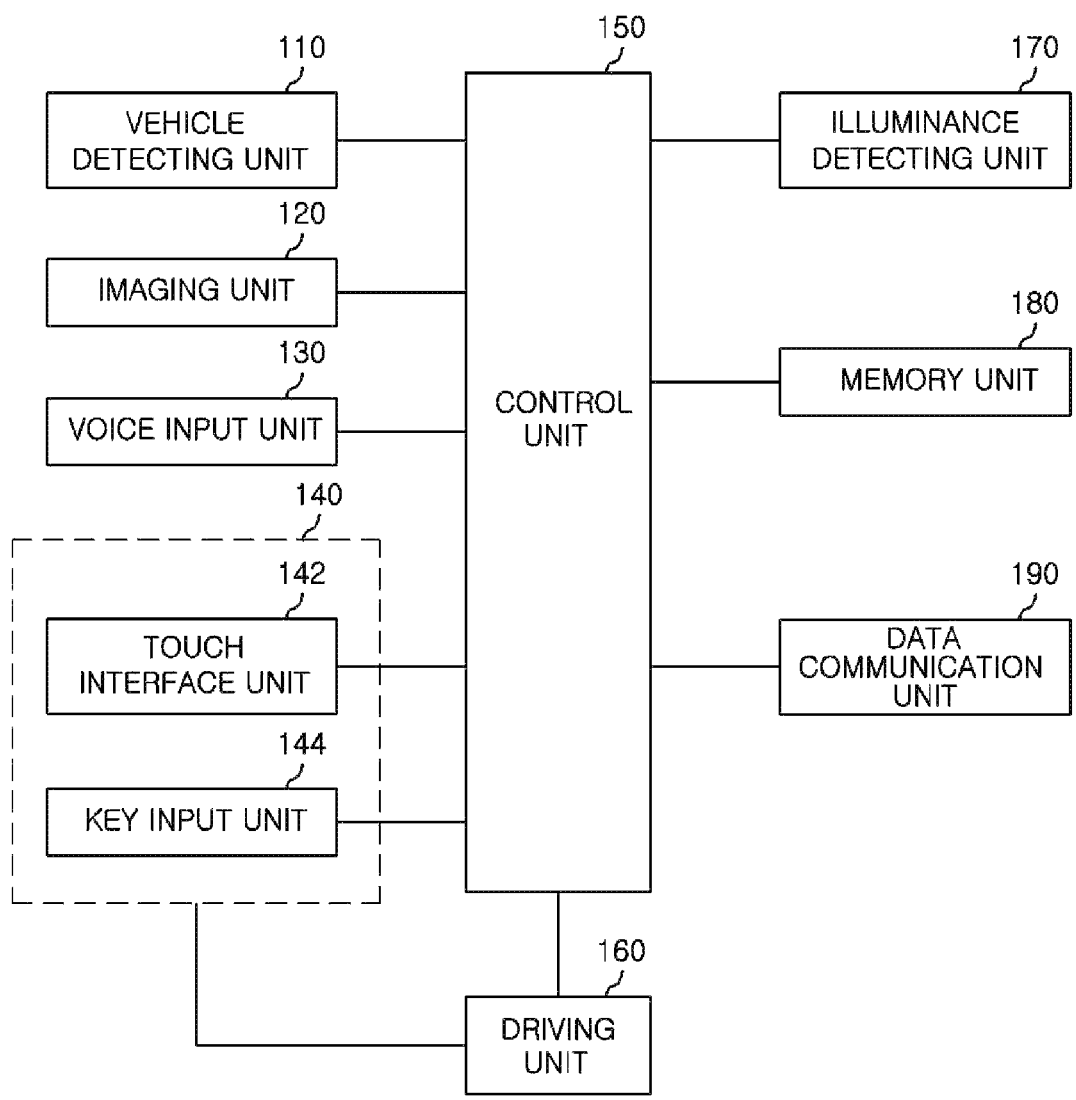
FIG. 1 is a block diagram of a financial automation device for a motor vehicle as an example of a kiosk device for a motor vehicle according to an embodiment of the present disclosure.

Advantages, features and methods for achieving them will become apparent from the embodiments which will be described later in detail with reference to the accompanying drawings. However, the present disclosure is not limited to the embodiments described herein below but may be implemented in many different forms. The embodiments are provided to make complete the present disclosure and to completely inform the scope of the present disclosure to a person having an ordinary knowledge in the field to which the present disclosure pertains. The present disclosure is defined only by the claims. Throughout the specification, the same components are designated by like reference numerals.

In describing the embodiments of the present disclosure, the detailed descriptions of well-known functions or configurations will be omitted if it is determined that the detailed descriptions of well-known functions or configurations may unnecessarily make obscure the spirit of the present disclosure. The terms to be described later are defined in view of the functions exercised in the embodiments of the present disclosure and may vary depending on the intention of a user or an operator and the practice. Thus, the definition of terms shall be made based on the overall contents of the subject specification.

FIG. 1 is a block diagram of a financial automation device for a motor vehicle as an example of a kiosk device for a motor vehicle according to an embodiment of the present disclosure. The terms such as financial automation device for a motor vehicle, financial automation transactions for a motor vehicle and the like are intended to merely illustrate examples to be applied to a kiosk device for a motor vehicle. It should be noted that the embodiments of the present disclosure may be applied not only to financial automation but also to various kinds of unmanned general information guidance service such as an unattended commodity sales service, an unmanned traffic information guidance service and the like. This will be apparent from the appended claims.

As shown in FIG. 1, the financial automation device for a motor vehicle may include a vehicle detecting unit 110, an imaging unit 120, a voice input unit 130, a touch interface unit 142, a key input unit 144, a control unit 150, a driving unit 160, an illuminance detecting unit 170, a memory unit 180 and a data communication unit 190.

The vehicle detecting unit 110 serves to detect a vehicle entering a financial automation device for a motor vehicle and may provide a detection signal to the control unit 150. The vehicle detecting unit 110 may include a non-contact type sensor such as a magnetic field sensor, a laser sensor or the like. These sensors may be installed inside the financial automation device for a motor vehicle based on, for example, the Internet of Things (IoT) or may be installed at a place separated from the financial automation device for a motor vehicle.

The imaging unit 120 serves to capture an image of the motor vehicle entering the financial automation device for a motor vehicle and may provide a captured image to the control unit 150. The imaging unit 120 may include, for example, a camera device adopting a CCD (Charge Coupled Device), a CMOS (Complementary Metal Oxide Semiconductor) or the like.

The voice input unit 130 may recognize the voice information of a vehicle occupant of a motor vehicle entering the financial automation device for a motor vehicle and may provide the recognized voice information to the control unit 150. The voice input unit 130 may include, for example, a microphone.

The touch interface unit 142 may display information relating to a financial automation transaction or may detect a touch input of a vehicle occupant of a motor vehicle entering the financial automation device for a motor vehicle. In this regard, the information relating to the financial automation transaction may include financial automation transaction information processed by the control unit 150, for example, a financial automation transaction initial screen, a deposit/withdrawal transaction screen, a password input screen and the like. Further, the signal detected by the vehicle occupant's touch input may include, for example, a capacitance type electric signal. A touch signal inputted through the touch interface unit 142 may be transmitted to the control unit 150.

The touch interface unit 142 may include, for example, a display device such as an LCD (Liquid Crystal Display), an OLED (Organic Light Emitting Diode) or the like, and a capacitive sensor for detecting an electrostatic capacitance.

The key input unit 144 is a means through which the information relating to a financial automation transaction of a financial automation device for a motor vehicle can be inputted in addition to the touch interface unit 142, and may include, for example, a key pad.

The touch interface unit 142 and the key input unit 144 may be collectively referred to as a financial automation transaction unit 140 of a financial automation device for motor vehicle. In this regard, the financial automation transaction unit 140 may refer to a functional block for inputting transaction information to the financial automation device or receiving financial automation transaction information from the financial automation device when a vehicle occupant of a motor vehicle executes a financial automation transaction.

The control unit 150 may activate the imaging unit 120, the voice input unit 130 and the financial automation transaction unit 140 when the entry of a motor vehicle is detected by the vehicle detecting unit 110. For example, when a motor vehicle enters the financial automation device for a motor vehicle, the control unit 150 may activate at least one of the imaging unit 120, the voice input unit 130, the touch interface unit 142 and the key input unit 144 to bring the same into an operation standby state.

Furthermore, the control unit 150 may analyze motion information of the vehicle occupant in the motor vehicle imaged by the imaging unit 120 or the voice information of the vehicle occupant inputted through the voice input unit 130. In this regard, the motion information of the vehicle occupant may include, for example, gesture recognition information, eye tracking information, or a combination of the gesture recognition information and the eye tracking information. In addition, the control unit 150 may analyze the motion information and the voice information in association with each other. For example, when the motion is detected after recognition of a voice or vice versa, it is possible to analyze the immediately previous information and the current information in association with each other. In addition, the control unit 150 may analyze motion information and voice information based on a predetermined priority order when the motion information and the voice information are inputted at the same time. For example, in case the motion information has a higher priority than the voice information, the motion information may be preferentially analyzed when the motion information and the voice information are inputted at the same time.

Specifically, the control unit 150 may analyze a direction of the vehicle occupant location with respect to the financial automation device for a motor vehicle. For example, the control unit 150 may analyzes the face position of the vehicle occupant from the image captured by the imaging unit 120 and may determine the analyzed face position as the direction of the vehicle occupant location. Alternatively, the control unit 150 may analyze the window position of the driver's seat of the motor vehicle from the image captured by the imaging unit 120 and may determine the analyzed window position as the direction of the vehicle occupant location. Alternatively, the control unit 150 may analyze the voice generation position of the vehicle occupant from the voice inputted to the voice input unit 130 and may determine the analyzed voice generation position as the direction of the vehicle occupant location.

When the direction of the vehicle occupant location is determined in this manner, the control unit 150 controls the driving unit 160 so that the financial automation transaction unit 140 operates toward the direction of the vehicle occupant location. The control unit 150 may be implemented by, for example, a processor such as a CPU (Central Processing Unit) or the like.

Based on the analysis result of the motion information and the voice information in the control unit 150, the driving unit 160 may drive the imaging unit 120, the voice input unit 130 and the financial automation transaction unit 140 so that the imaging unit 120 and the voice input unit 130 are operated to face the direction of the vehicle occupant location. The driving unit 160 may drive at least one of the imaging unit 120, the voice input unit 130 and the touch interface unit 142 to make a specific operation. For example, the driving unit 160 may tilt, swivel or elevate at least one of the imaging unit 120, the voice input unit 130 and the touch interface unit 142. In this regard, the term "tilt" may refer to a function of inclining an object forward and backward, the term "swivel" may refer to a function of rotating an object clockwise and counterclockwise, and the term "elevate" may refer to a function of moving an object up and down. Such an operation of the driving unit 160 may be an operation by which the financial automation device for a motor vehicle is operated to face the position of the vehicle occupant entering the financial automation device.

The illuminance detecting unit 170 may detect the ambient illuminance around the touch interface unit 142 when the touch interface unit 142 is tilted, swiveled or elevated. The detected ambient illuminance may be transmitted to the control unit 150. Therefore, the control unit 150 may adjust the brightness of the touch interface unit 142 based on the ambient illuminance detected by the illuminance detecting unit 170. For example, if the ambient illuminance is equal to or greater than a set value, the brightness level of the touch interface unit 142 may be increased to a first level. If the ambient illuminance is less than the set value, the brightness level of the touch interface unit 142 may be lowered to a second level.

The memory unit 180 may store an operation program for driving the financial automation device for a motor vehicle and various data relating to financial transactions. In particular, the analysis priority in the control unit 150 according to the embodiment of the present disclosure may be preset in the memory unit 180. For example, in the embodiment of the present disclosure, the priority order of motion information and voice information may be set in advance. The memory unit 180 may be implemented by, for example, a nonvolatile memory element such as an EEPROM (Electrically Erasable Programmable Read-Only Memory).

Under the control of the control unit 150, the data communication unit 190 may transfer various data to a specified path (for example, a management and operation server or a financial transaction system) via a communication network such as the Internet or the like and may transfer the data received via the communication network to the control unit 150. For example, the data communication unit 190 may serve as an interface in the data exchange between the financial automation device for a motor vehicle and the management server (not shown) and between the financial automation device for a motor vehicle and the financial transaction system (not shown).

Figure 2:
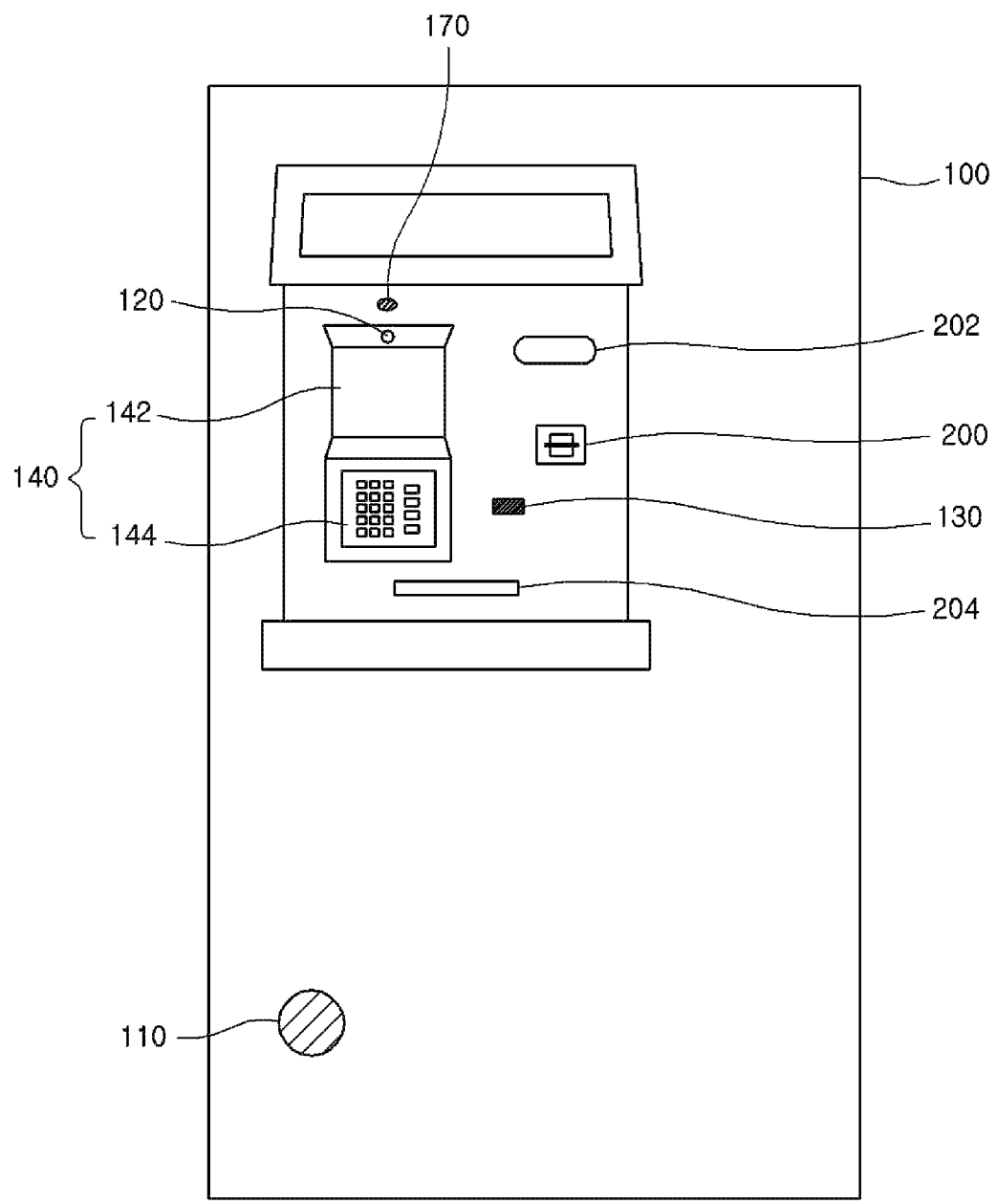
FIG. 2 is a schematic view of the financial automation device for a motor vehicle shown in FIG. 1.

FIG. 2 is a schematic view of the financial automation device for a motor vehicle shown in FIG. 1. The financial automation device may include a financial automation device main body 100, the vehicle detecting unit 110, the imaging unit 120, the voice input unit 130, the touch interface unit 142, the key input unit 144, a card reader unit 200, a printing unit 202 and a deposit/withdrawal unit 204. As in the financial automation device shown in FIG. 1, the touch interface unit 142 and the key input unit 144 may be collectively referred to as the financial automation transaction unit 140. Among the respective components shown in FIG. 2, the same components as those shown in FIG. 1 will not be described. Some of the components shown in FIG. 1 are omitted in FIG. 2 for the sake of convenience.

The vehicle detecting unit 110 may be attached to a predetermined position of the financial automation device for a motor vehicle, for example, a lower part of the financial automation device to facilitate detection of a bumper or a tire of a motor vehicle.

The financial automation device for a motor vehicle may further include the card reader unit 200, the printing unit 202 and the deposit/withdrawal unit 204 in addition to the imaging unit 120, the voice input unit 130, the touch interface unit 142 and the key input unit 144 described with reference to FIG. 1.

The card reader unit 200 may be installed at a predetermined position on the front panel of the financial automation device for a motor vehicle and may read card information from a magnetic stripe or an IC (Integrated circuit) attached to a financial card such as a cash card, a check card, a credit card or the like.

The printing unit 202 may output a detailed list including various histories related to financial transactions. For example, the printing unit 202 may output contents dealt in the financial automation device as a deposit/withdraw list or the like.

The deposit/withdrawal unit 204 may count the cash to be deposited, may store the counted cash in a cash storage box, and may provide count data related to the cash count to the control unit 150. Furthermore, in response to the withdrawal request from the control unit 150, the deposit/withdrawal unit 184 may withdraw the cash from the cash storage box to the outside. In this case, the cash storage box used for deposit and the cash storage box used for withdrawal may be prepared separately.

The illuminance detecting unit 170 may be attached to an upper part of the front surface of the financial automation device, preferably a peripheral portion of the touch interface unit 142. When the touch interface unit 142 is operated, the illuminance detecting unit 170 may detect the illuminance around the touch interface unit 142.

Hereinafter, with the above-described configuration, a method for operating the kiosk device for a motor vehicle according to the embodiment of the present disclosure, for example, the financial automation device for a motor vehicle will be described in detail with reference to a flowchart of FIG. 3.

Figure 3:
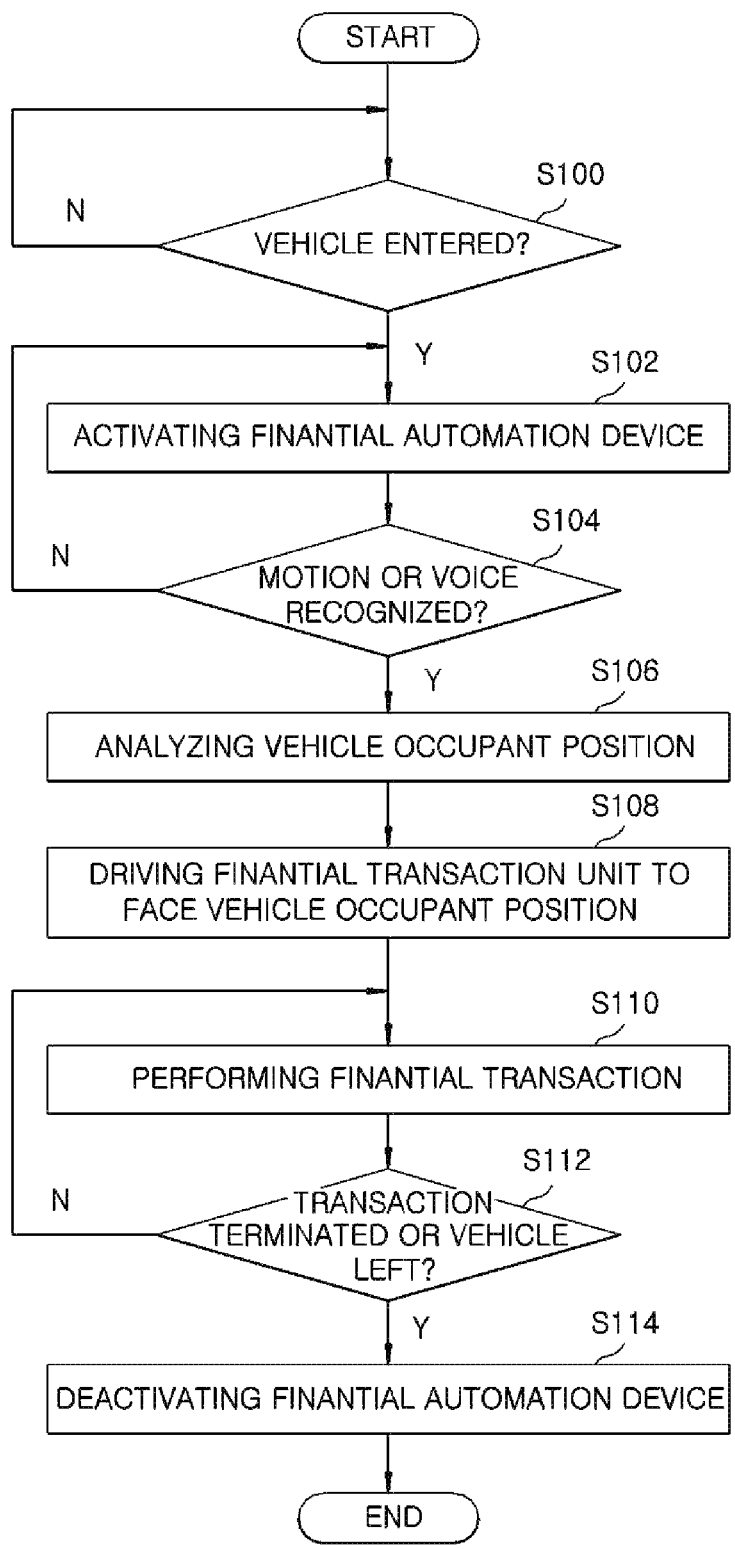
FIG. 3 is a flowchart for explaining a method of driving a financial automation device for a motor vehicle as an example of a vehicle kiosk device for a motor vehicle according to an embodiment of the present disclosure.

As shown in FIG. 3, when a motor vehicle entering the financial automation device for a motor vehicle is detected by the vehicle detecting unit 110 (S100), the control unit 150 may activate the imaging unit 120, the voice input unit 130 and the financial automation transaction unit (S102). For example, when the entry of the motor vehicle is detected, the control unit 150 activates both the imaging unit 120 and the voice input unit 130 and activates the touch interface unit 142 and the key input unit 144.

At this time, the control unit 150 may determine through the image captured by the imaging unit 120 whether the motion of the vehicle occupant is detected or may determine through the voice input unit 130 whether the voice of the vehicle occupant is inputted (S104).

When the motion of the vehicle occupant is detected or when the voice of the vehicle occupant is inputted, the control unit 150 may analyze the motion information or the voice information of the vehicle occupant (S106). For example, the control unit 150 may analyze the direction of the vehicle occupant location with respect to the financial automation device based on the face position of the vehicle occupant, the window position of the driver's seat or the voice generation position of the vehicle occupant.

On the other hand, the motion information and the voice information of the vehicle occupant may be inputted at the same time. In this case, the control unit 150 may analyze the motion information or the voice information based on the priority order preset in the memory unit 180. For example, in case the motion information has a higher priority than the voice information, the control unit 150 may preferentially analyze the motion information when the motion information and the voice information are inputted at the same time.

At this time, when next information is inputted after analyzing the information having a higher priority, the control unit 150 may perform a selective analysis process depending on whether the next information has the higher priority or a lower priority. For example, in case the motion information has the higher priority and the voice information has the lower priority, when the next information is the same motion information as the information having the higher priority, the control unit 150 may not execute an analysis process. If the next information is the voice information different from the information having the higher priority, the control unit 150 may inquire a user whether or not to execute an analysis process. If the content of the next information is contiguous with the analysis content of the motion information having the higher priority, namely if the next information having the lower priority is inputted after the information having the higher priority has been analyzed, the next information may be analyzed.

Based on these analysis results, the control unit 150 may control the driving unit 160 so that the imaging unit 120, the voice input unit 130 and the financial automation transaction unit 140 are driven to face the direction of the vehicle occupant location (S108). For example, the control unit 150 may control the driving unit 160 so that the imaging unit 120, the voice input unit 130 and the financial automation transaction unit 140 are tilted, swiveled or elevated. However, such operations of the imaging unit 120, the voice input unit 130 and the financial automation transaction unit 140 are exemplary. It should be noted that the respective components, for example, the imaging unit 120, the voice input unit 130 and the touch interface unit 142 may be tilted, swiveled or elevated separately or simultaneously. In this case, the control unit 150 may properly adjust the brightness of the touch interface unit 142 to the ambient illuminance while controlling the operation of the touch interface unit 142.

Thereafter, the control unit 150 may perform the financial automation transactions of the vehicle occupant through the financial automation device for a motor vehicle (S110). The financial automation transactions may include, for example, cash deposit and withdrawal, check deposit and withdrawal, inquiries of transaction details, and the like.

On the other hand, when the above-described financial automation transactions are terminated or when the departure of the motor vehicle is detected (S112), the control unit 150 may deactivate the imaging unit 120, the voice input unit 130 and the financial automation transaction unit 140 (S114). For example, when a transaction termination request signal is received through the touch interface unit 142 or when a vehicle occupant motion signal is not received for a predetermined time from the imaging unit 120, the control unit 150 may deactivate the imaging unit 120, the voice input unit 130 and the financial automation transaction unit 140. In addition, when it is determined based on the detection operation of the vehicle detecting unit 110 that the motor vehicle has left the financial automation device, the control unit 150 may similarly deactivate the imaging unit 120, the voice input unit 130 and the financial automation transaction unit 140.

In this regard, the deactivation may include, for example, an operation of temporarily shutting off the driving power of the imaging unit 120, the voice input unit 130 and the touch interface unit 142. The driving power at this time is the electric power for actually driving the respective components. The standby power for the imaging unit 120, the voice input unit 130 and the financial automation transaction unit 140 need to be always supplied.

As described above, according to the embodiments of the present disclosure, it is possible to quickly operate an input/output interface for kiosk transactions at the time of vehicle entry. It is also possible to provide an input/output interface environment for kiosk transactions that can improve the user convenience in terms of a vehicle occupant. Thus, according to the embodiments of the present disclosure, it is possible to enhance the service satisfaction level of a kiosk device for a motor vehicle.

The combinations of respective blocks of block diagrams and respective sequences of a flow diagram attached herein may be carried out by computer program instructions. Since the computer program instructions may be loaded in at least one processor of a general purpose computer, a special purpose computer, or other programmable data processing apparatus, the instructions, carried out by the processor of the computer or other programmable data processing apparatus, create means for performing functions described in the respective blocks of the block diagrams or in the respective sequences of the sequence diagram. Since the computer program instructions, in order to implement functions in specific manner, may be stored in a memory useable or readable by a computer or a computer aiming for other programmable data processing apparatus, the instruction stored in the memory useable or readable by a computer may produce manufacturing items including an instruction means for performing functions described in the respective blocks of the block diagrams and in the respective sequences of the sequence diagram. Since the computer program instructions may be loaded in a computer or other programmable data processing apparatus, instructions, a series of sequences of which is executed in a computer or other programmable data processing apparatus to create processes executed by a computer to operate a computer or other programmable data processing apparatus, may provide operations for executing functions described in the respective blocks of the block diagrams and the respective sequences of the flow diagram.

Moreover, the respective blocks or the respective sequences in the appended drawings may indicate some of modules, segments, or codes including at least one executable instruction for executing a specific logical function(s). In several alternative embodiments, it is noted that the functions described in the blocks or the sequences may run out of order. For example, two consecutive blocks and sequences may be substantially executed simultaneously or often in reverse order according to corresponding functions.

The explanation as set forth above is merely described a technical idea of the exemplary embodiments of the present disclosure, and it will be understood by those skilled in the art to which this disclosure belongs that various changes and modifications may be made without departing from the scope of the essential characteristics of the embodiments of the present disclosure. Therefore, the exemplary embodiments disclosed herein are not used to limit the technical idea of the present disclosure, but to explain the present disclosure, and the scope of the technical idea of the present disclosure is not limited to these embodiments. Therefore, the scope of protection of the present disclosure should be construed as defined in the following claims and changes, modifications and equivalents that fall within the technical idea of the present disclosure are intended to be embraced by the scope of the claims of the present disclosure.

What is claimed is:

1. A kiosk device for a motor vehicle, comprising:
an imaging unit;
a voice input unit;
a vehicle detecting unit configured to detect a motor vehicle adjacent to the kiosk device;
a financial automation transaction unit including a touch interface unit;
a control unit configured to, when the motor vehicle adjacent to the kiosk device is detected by the vehicle detecting unit, activate the imaging unit and the voice input unit and analyze motion information of a vehicle occupant imaged by the imaging unit or voice information of the vehicle occupant inputted through the voice input unit; and
a driving unit configured to drive the financial automation transaction unit based on an analysis result of the motion information or the voice information so that the financial automation transaction unit is operated to face a direction of a vehicle occupant location,
wherein the vehicle detecting unit is disposed lower than the financial automation transaction unit,
wherein the motion information includes eye tracking information,
wherein the driving unit is configured to tilt, swivel or elevate the imaging unit, the voice input unit and the touch interface unit, and
when the motion information is detected after recognition of the voice information or the voice information is detected after recognition of the motion information, the control unit is configured to analyze previous detected motion or voice information and current detected motion or voice information in association with each other, respectively,
wherein the control unit is configured to analyze the detected motion information or the detected voice information according to a preset priority order when the detected motion information and the detected voice information are received at the same time, and
wherein the control unit further configured to inquire to a user whether or not to execute analyzing of next kiosk input information having a lower priority order according to the preset priority order, the next information received after analyzing the detected motion information and the detected voice information received at the same time.

2. The device of claim 1, wherein the control unit is configured to analyze the direction of the vehicle occupant location with respect to the kiosk device.

3. The device of claim 1, wherein the control unit is configured to analyze a face position of the vehicle occupant based on an image captured by the imaging unit and to determine the analyzed face position as the direction of the vehicle occupant location.

4. The device of claim 1, wherein the control unit is configured to analyze a window position of a driver's seat of the motor vehicle based on an image captured by the imaging unit and to determine the analyzed window position as the direction of the vehicle occupant location.

5. The device of claim 1, wherein the control unit is configured to analyze a voice generation position of the vehicle occupant based on a voice inputted by the voice input unit and to determine the analyzed voice generation position as the direction of the vehicle occupant location.

6. The device of claim 1, further comprising:
an illuminance detecting unit configured to detect ambient illuminance around the touch interface unit when the touch interface unit is operated,
wherein the control unit is configured to adjust brightness of the operated touch interface unit based on the detected ambient illuminance.

7. A method for operating a kiosk device for a motor vehicle including an imaging unit, a voice input unit, a vehicle detection unit, and a financial automation transaction unit, the method comprising:
activating the imaging unit and the voice input unit when a motor vehicle adjacent to the kiosk device is detected;
analyzing motion information of a vehicle occupant imaged by the imaging unit or voice information of the vehicle occupant received through the voice input unit according to a preset priority order when the motion information and the voice information are received at the same time; and
driving the imaging unit and the voice input unit based on an analysis result of the motion information or the voice information so that the financial automation transaction unit including a touch interface unit is operated to face a direction of a vehicle occupant location,
wherein the detecting of the motor vehicle adjacent to the kiosk device is executed by the vehicle detecting unit disposed lower than the financial automation transaction unit,
wherein the motion information includes eye tracking information, and
wherein said driving includes tilting, swiveling or elevating the imaging unit, the voice input unit and the touch interface unit,
wherein, said analyzing includes analyzing previous motion or voice information and current motion or voice information in association with each other, respectively, when the motion information is detected after recognition of the voice information or the voice information is detected after recognition of the motion information, and
wherein said analyzing includes inquiring to a user whether or not to execute analyzing of next kiosk input information having a lower priority order according to the preset priority when the next information is received after analyzing the detected motion information and the detected voice information received at the same time based on the preset priority order.

8. The method of claim 7, wherein said analyzing includes analyzing the direction of the vehicle occupant location with respect to the kiosk device.

9. The method of claim 7, wherein said analyzing includes analyzing a face position of the vehicle occupant based on an image captured by the imaging unit and determining the analyzed face position as the direction of the vehicle occupant location.

10. The method of claim 7, wherein said analyzing includes analyzing a window position of a driver's seat of the motor vehicle based on an image captured by the imaging unit and determining the analyzed window position as the direction of the vehicle occupant location.

11. The method of claim 7, wherein said analyzing includes analyzing a voice generation position of the vehicle occupant based on a voice inputted by the voice input unit and determining the analyzed voice generation position as the direction of the vehicle occupant location.

12. The method of claim 7, further comprising:
detecting ambient illuminance around the touch interface unit when the touch interface unit is operated, and
adjusting brightness of the operated touch interface unit based on the detected ambient illuminance.

* * * * *